United States Patent [19]
Gabriel et al.

[11] 3,754,954
[45] Aug. 28, 1973

[54] ALTERING THE PROPERTIES OF CONCRETE BY ALTERING THE QUALITY OR GEOMETRY OF THE INTERGRANULAR CONTACT OF FILLER MATERIALS

[75] Inventors: Lester H. Gabriel, Sacramento; Wilfred Willis, San Francisco, both of Calif.

[73] Assignee: Gabriel-Willis Associates, San Francisco, Calif.

[22] Filed: Aug. 10, 1971

[21] Appl. No.: 170,490

Related U.S. Application Data

[60] Division of Ser. No. 886,556, Dec. 19, 1969, Continuation-in-part of Ser. No. 792,370, Jan. 21, 1969, abandoned.

[52] U.S. Cl. ................................ 106/97, 106/98
[51] Int. Cl. ........................................... C04b 7/02
[58] Field of Search ............................. 106/97, 98

[56] References Cited
UNITED STATES PATENTS
3,226,242  12/1965  Huettemann .................. 106/97

*Primary Examiner*—James E. Poer
*Attorney*—Owen, Wickersham & Erickson

[57] ABSTRACT

A method for preparing and molding concrete so as to impart great strength per weight, minimize or otherwise alter shrinkage and creep, reduce porosity and give a superior as-molded surface. Aggregates are dry mixed with cement (or cement-filler mixture) in a preparation such that the bulk volume of dry cement (or cement-filler mixture) is approximately equal to the volume of void space which the aggregates would have if the cement were not present. A mold is filled with the resultant dry mixture, the ingredients of which are so proportioned that a particular geometry of particle contact is achieved upon compaction. The quality and geometry of this contact (coupled with the properties of the particular filler materials) determine the properties of the finished product. Then, with no disturbance to this compacted preordered structure of particle contact, water is injected and distributed by a self-metering process dependent upon capillary action which itself is dependent upon the geometry of particle contact. With the assistance or opposition of gravitational forces and with or without increased pressure differential, this water is introduced in a manner such that the water sweeps the air from the remaining voids and ejects that air into the atmosphere. The resultant wet, compact mixture is then cured in the mold or forms.

11 Claims, 23 Drawing Figures

Patented Aug. 28, 1973 3,754,954
6 Sheets-Sheet 1
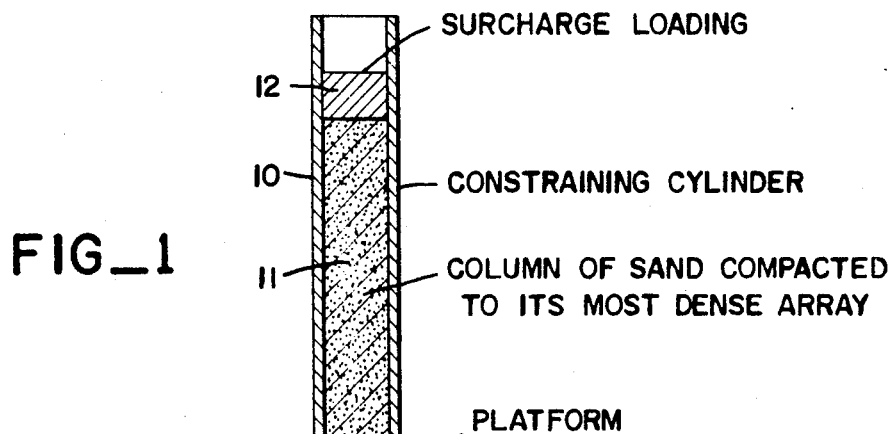
FIG_1
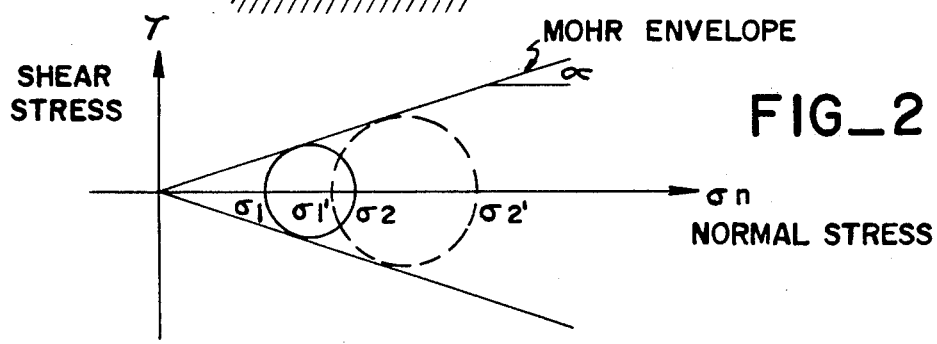
FIG_2
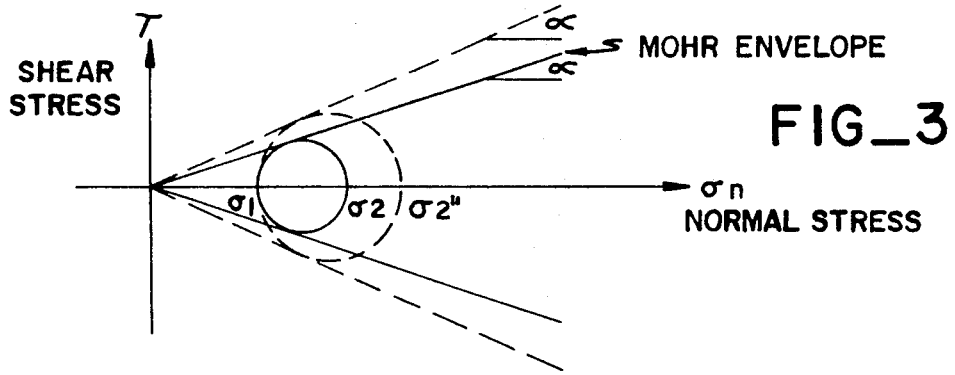
FIG_3
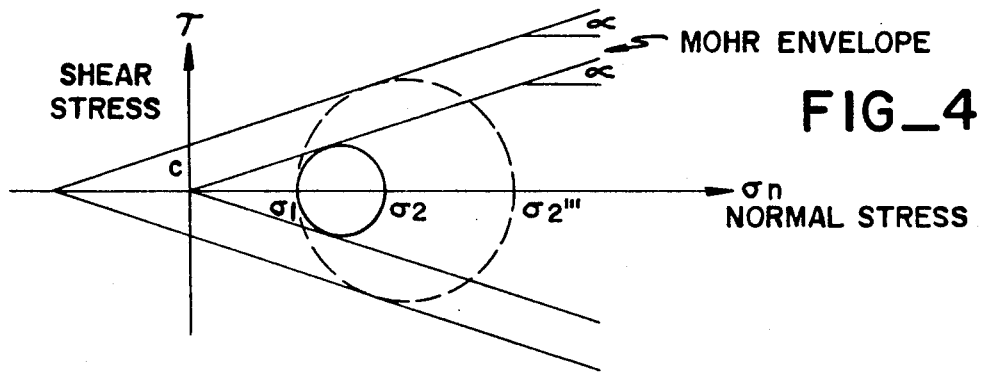
FIG_4

Patented Aug. 28, 1973 3,754,954
6 Sheets-Sheet 2
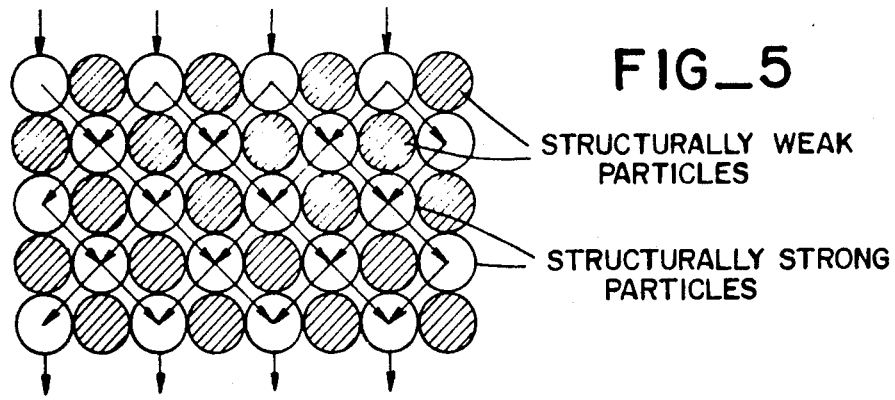
FIG_5
 FIG_5a
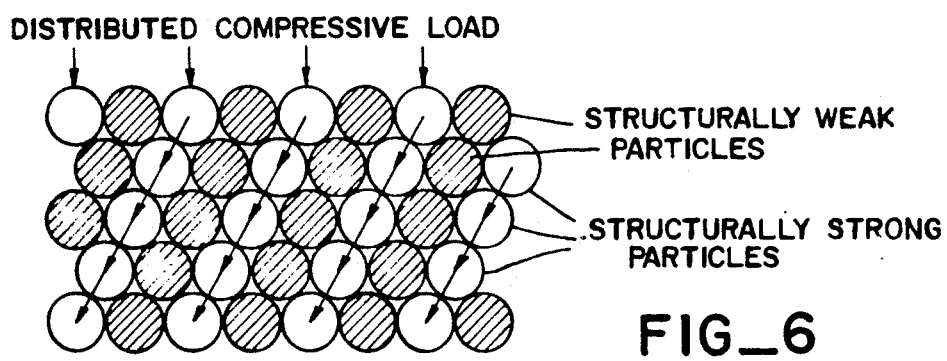
FIG_6
FIG_6a
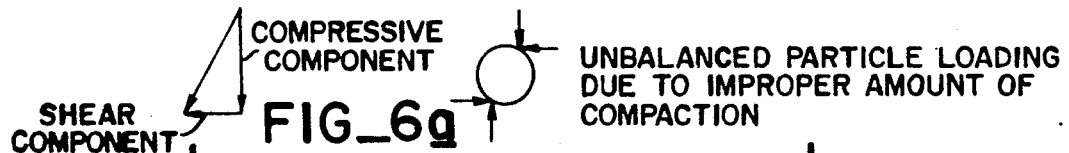
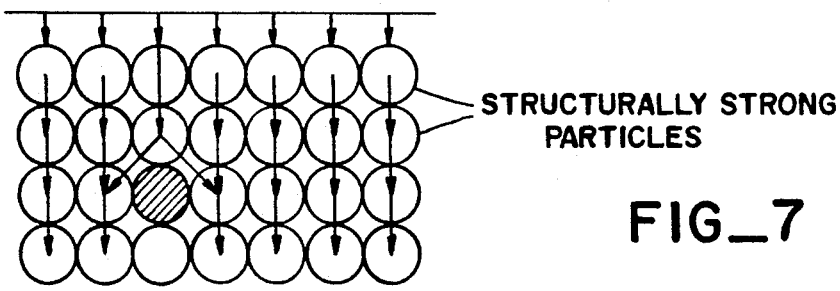
FIG_7
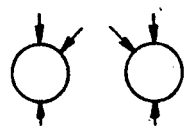 FIG_7a
UNBALANCED PARTICLE LOADING DUE TO INCLUSION OF TOO FEW STRUCTURALLY WEAK PARTICLES

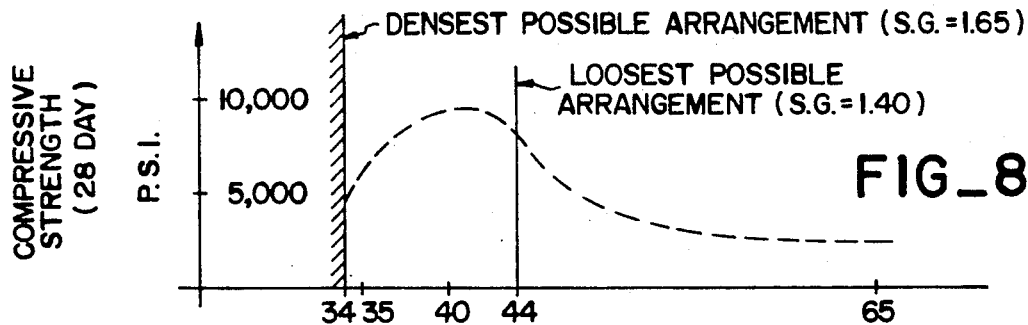
FIG_8
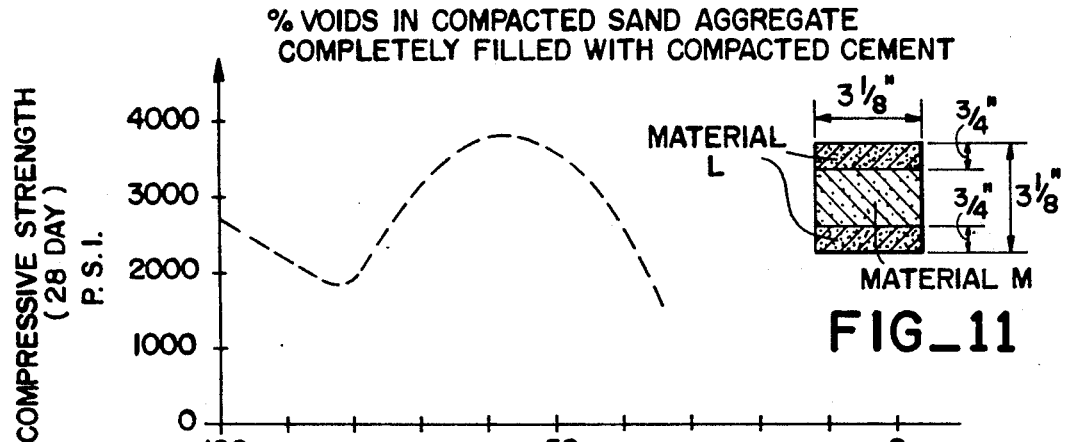
FIG_9
FIG_11
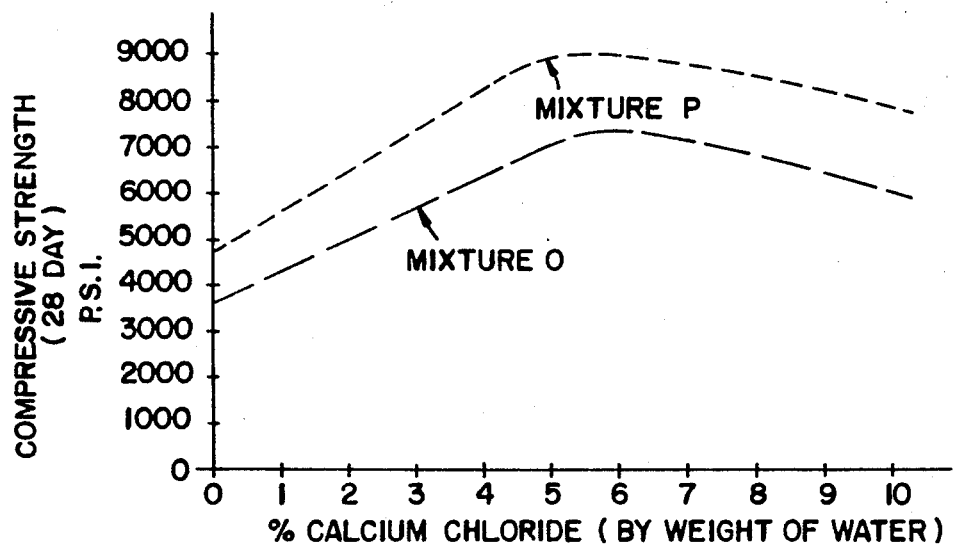
FIG_12
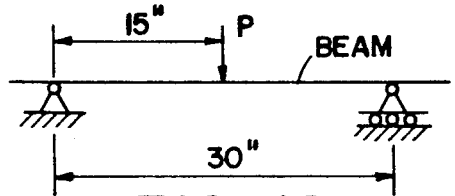
FIG_10

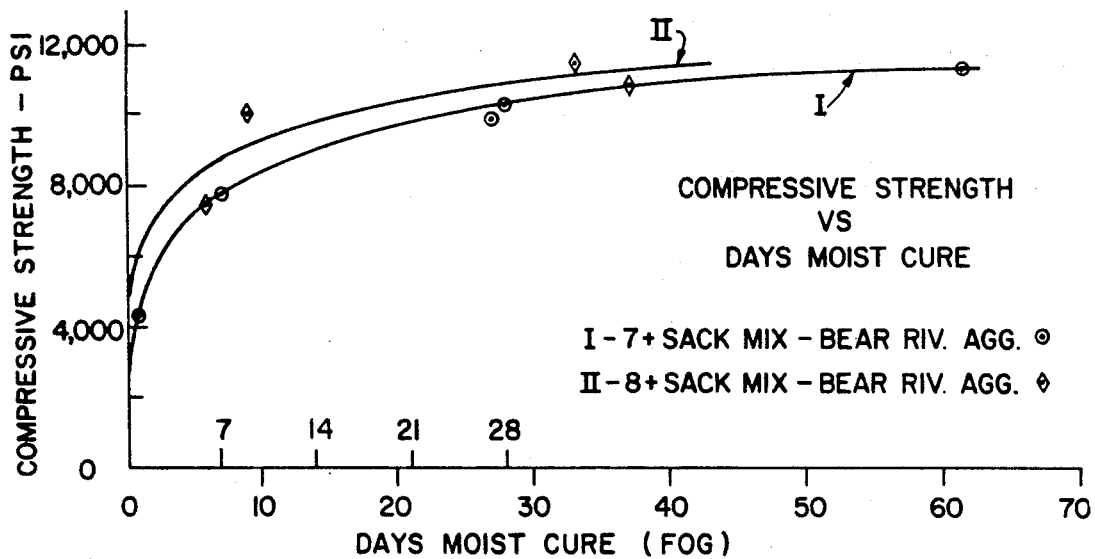
FIG_13
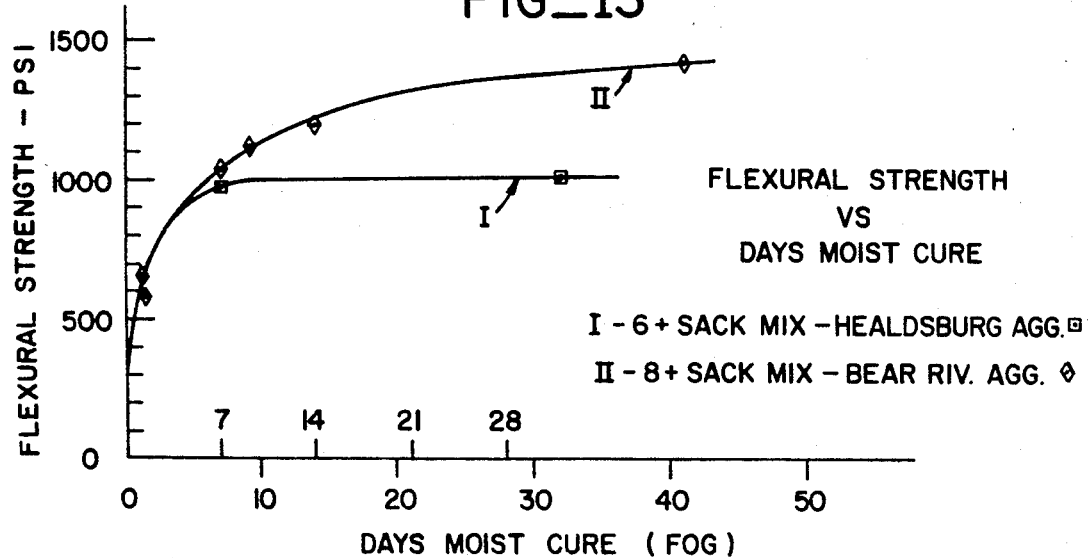
FIG_14
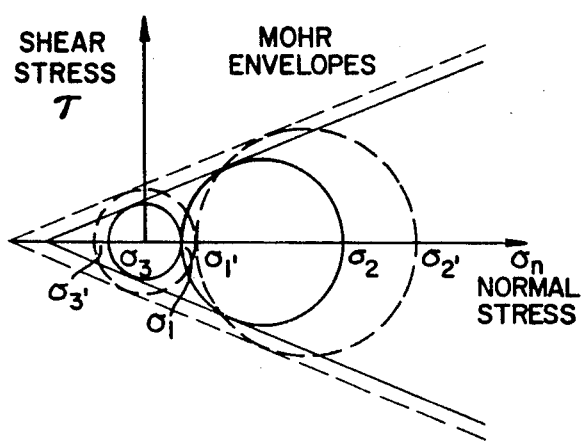
FIG_15

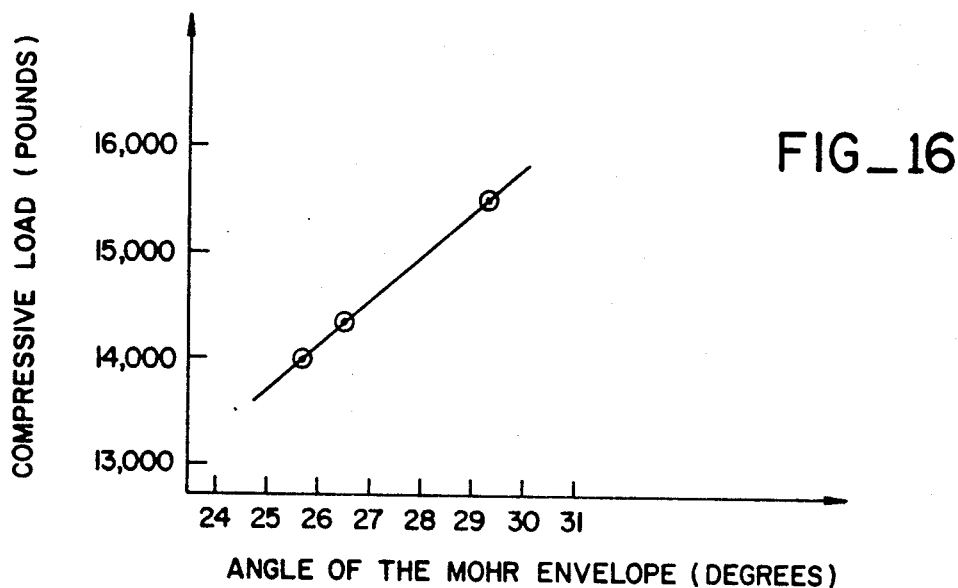
FIG_16
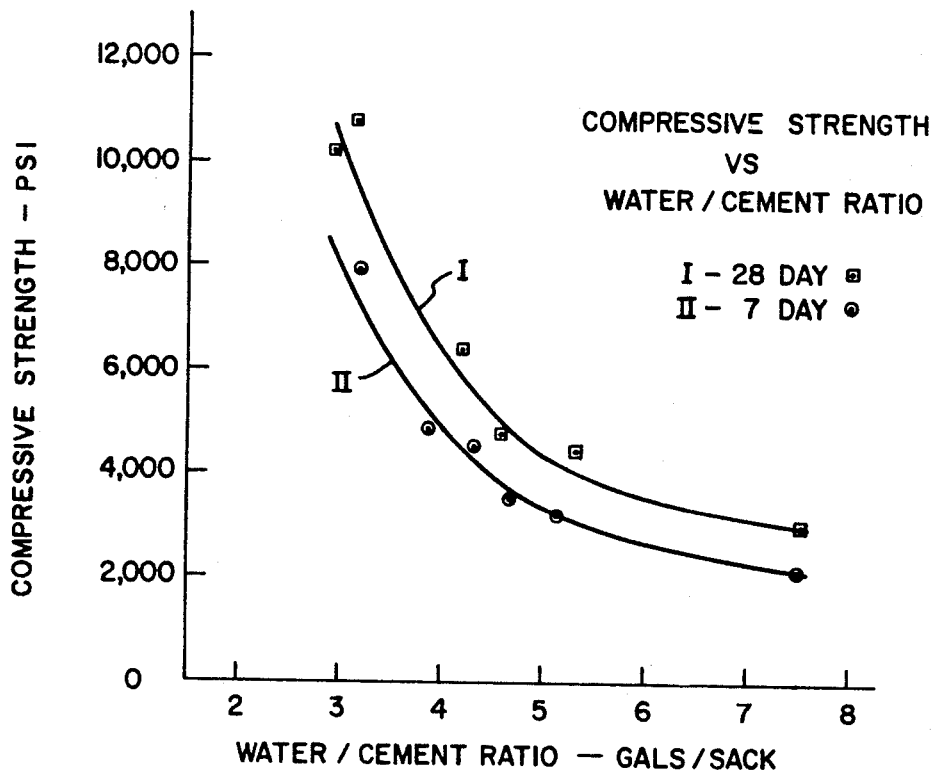
FIG_17

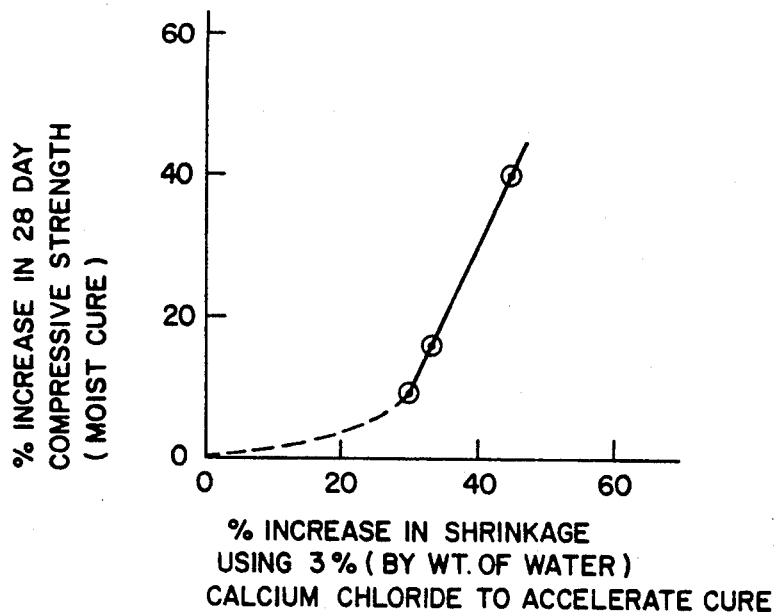
FIG_18
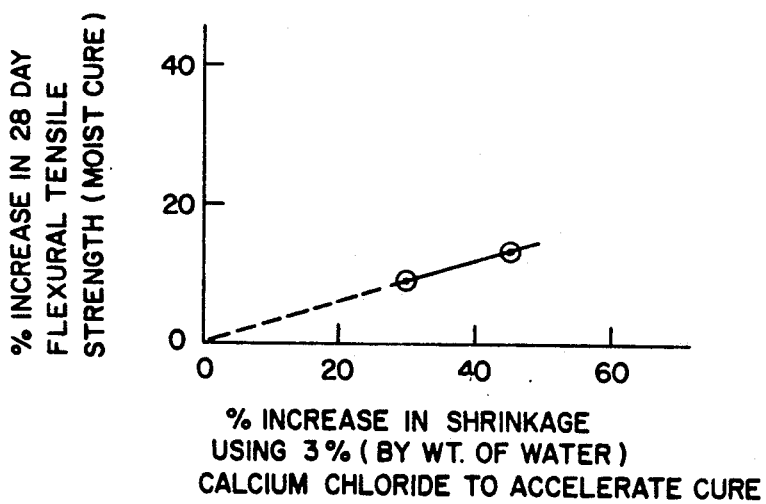
FIG_19
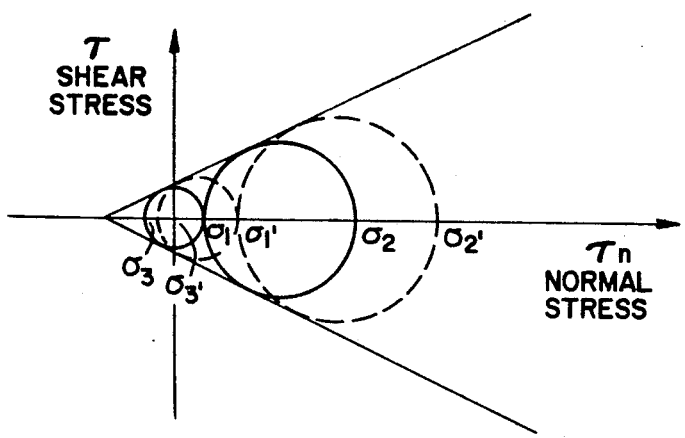
FIG_20

ALTERING THE PROPERTIES OF CONCRETE BY ALTERING THE QUALITY OR GEOMETRY OF THE INTERGRANULAR CONTACT OF FILLER MATERIALS

This application is a division of application Ser. No. 886,556 filed Dec. 19, 1969, which was a continuation-in-part of application Ser. No. 792,370 filed Jan. 21, 1969, which is now abandoned.

This invention relates to improvements in concrete. It enables the making of stronger concrete and concrete that has more strength per weight than heretofore. It also enables improvement of many other qualities and properties of the concrete.

The invention has three basic aspects. The first relates to the manner of formulation, compaction, and water addition; this aspect applies both when conventional and non-conventional materials are used, for it relates to any cementitious product which uses a hydraulic cement as the binder for filler aggregate particles. The second aspect of the invention incorporates the first aspect and, in addition, relates to significant alteration of the normal properties of cementitious products through the addition in a novel manner of large quantities of materials able to impart desired properties. As an example, the normal density can be significantly reduced through the addition of a very low density material, while imparting only minimum reduction in strength. A third aspect, which applies to both of these other aspects, though especially to the second one, is that of inhibiting segregation of the concrete mixture; i.e., it applies to preventing an optimum configuration and mixture from being dissipated by partial separation of some components of the mixture from others.

Concrete is normally mixed wet before pouring, and forms a paste of the cement and water which coats all of the aggregrate particles. When the wet mixture is poured into the mold, the aggregate particles are not in direct contact with each other but are of necessity separated by a film or larger quantity of cement and/or water. This separation is quite independent of the degree of compaction of the mixture, both during and after pouring, and we have found that it may impart a fundamental weakness to the concrete.

Another difficulty arises because wet mixes require the addition of considerably more water than what is actually required for hydration, the additional water being used to increase the flowability of the wet mix, so as to permit proper handling and filling of the mold or forms. As a result, the excess water eventually evaporates, leaving voids; hence, the cement is left weaker than it would have been if the excess water had never been present. Also, large or small voids are left as a consequence of entrapping air during the placing process.

A further difficulty heretofore has arisen because the quantities and sizes of aggregates chosen for a wet mix are based primarily on obtaining such workability in the wet mix as is commensurate with the quantity of cement chosen for the desired strength. This basis of choice of aggregate sizes and quantities, coupled with the excess water, has often led to excess segregation.

The present invention overcomes these problems by a novel dry-mix procedure.

The invention also relates to a novel use of lightweight aggregate constituents in a manner such that the strength of lightweight concrete is markedly improved.

Among the objects of the invention are the provision of concrete having improved compressive strength, improved tensile strength, reduced porosity, greater resistance to subsequent wetting, better as-molded surface appearance and uniformity, better texture both on the surface and in the body, better receptivity to paints, and better control of properties in general.

Briefly summarized, the method calls for dry mixing aggregates with cement (or a cement-filler mixture in which the particle size of the filler is of the same order of size as the cement) in such a manner that the bulk volume of all the cement-size particles is approximately equal to the volume of void space which the aggregates would have if the cement-size particles were not present. A mold is filled with the resultant dry mixture, the ingredients of which are so proportioned as to achieve, in consequence of a subsequent compaction step, a particular geometry of particle contact. The quality and geometry of this contact (coupled with the properties of the particular filler materials, including aggregates) determines the properties of the finished product. Then, after compaction and with no disturbance to the compacted preordered structure of particle contact, water is injected and distributed by a self-metering process dependent upon capillary action—which itself is dependent upon the geometry of the particle contact. Th water is introduced in a manner such that the water sweeps the air from the remaining voids and ejects that air into the atmosphere. The resultant wet, compact mixture is then cured in the mold or forms.

In lightweight concrete of this invention, segregation of the lighter components from the heavier components is inhibited, thereby solving a most pressing problem in the handling of materials and in the ordering of the structure of the dry material particles.

Other objects and advantages of the invention will appear from the following description of some preferred forms of the invention:

In the drawings:

FIG. 1 is a diagrammatic view in elevation and in section of a mold containing a column of compacted aggregate, illustrating some aspects of an underlying theory of the invention.

FIG. 2 is a diagram showing a Mohr envelope for certain relationships between shear stress and normal stress.

FIG. 3 is a similar diagram for another instance.

FIG. 4 is another similar diagram for yet another instance.

FIG. 5 is a diagrammatic representation of a loose 50—50 pack of structurally strong and structurally weak particles.

FIG. 5A is a force diagram of a balanced loaded particle of FIG. 5.

FIG. 6 is a similar diagram of a denser pack of the same type of particles.

FIG. 6A is a force diagram of an unbalanced loaded particle of FIG. 6.

FIG. 7 is a similar diagram of a pack of structurally strong particles around only one structurally weak particle.

FIG. 7A is a force diagram of the unbalanced loading of the particles adjacent to the weak particle of FIG. 7, shown in two different unbalanced loadings.

FIG. 8 is a graph obtained from the data of Example 1 below, showing the relationship between the percent voids in compacted sand aggregate completely filled with compacted cement.

FIG. 9 is a graph of the compressive strength obtained per amount of cement in a mix of cement and phenolic microballoons.

FIG. 10 is a diagram showing how the beams of Example 5 are tested.

FIG. 11 is a view in cross-section of one of the beams tested according to FIG. 10.

FIG. 12 is a comparison of compressive strengths obtained from two basic mixtures of this invention with varying amounts of calcium chloride in the water added to capillary action.

FIG. 13 is a graph where compressive strength has been plotted against days of moist cure for two basic mixes made according to the principles of this invention.

FIG. 14 is a graph of flexural strength plotted against days of moist cure for two basic mixes prepared according to the principles of this invention.

FIG. 15 is a Mohr envelope diagram comparing the shear stress per normal stress of two mixes differing only in cement content, the solid line envelope and circles representing a concrete having less cement per aggregate than the broken-line envelope and circles.

FIG. 16 is a graph wherein compressive load is compared with the angle of the Mohr envelope of failure for a series of sand-cement concretes differing only in the sands used.

FIG. 17 is a graph plotting compressive strengh against the water-to-cement ratio for two different types of concrete both made according to the principles of this invention.

FIG. 18 is a graph showing the increase in compressive strength corresponding to increased shrinkage in concrete of the present invention which incorporates calcium chlorde as a cure accelerator.

FIG. 19 is a graph showing the increase in flexural tensile strength corresponding to the increase in shrinkage in the same concrete as for FIG. 18.

FIG. 20 is a Mohr envelope diagram comparing the qualities of concrete with and without an accelerator that quickens cure and increases shrinkage.

In the first aspect of the invention, graded fine and coarse aggregates, preferably with angular grains, are mixed together. If these aggregates were to be densely compacted, they would have a certain percentage of void space between particles. A quantity of cement calculated to be approximately equal to the volume of that void space when the dry cement is in a compacted dense array, is added. The dry aggregate is then mixed with the added cement, and the dry mixture is poured into the mold or forms, the pouring being done in a manner minimizing segregation. The dry mixture is then compacted as much as possible in the mold or forms, as by a combination of vibration and tamping, so as to approach the volume which the well-compacted aggregate would have had without any cement being present; i.e., the cement completely fills all the voids between the aggregates. Water is then added by exposing a portion of the concrete to water, for instance, through small holes at the bottom of the mold. Capillary action is sufficient to draw the water throughout the concrete mix, sweeping the air in the minute capillary-size void spaces ahead of the water and eventually out of the mold. Additives, such as calcium chloride, may be included. The concrete is then cured in the normal manner.

A very important feature of this invention is that the water which is introduced by capillary, gravitational, hydraulic pressure, or other forces must displace the air in the voids to be filled with water. Any mold or casting bed is designed to avoid, as much as can be, the trapping of air within the dry mixture to be infused with water. Trapped air inhibits the full penetration of water to the region of the entrapped air and tends to prevent the successful or at least optimum use of this invention. For instance, in the application to a slab, water should not be introduced simultaneously to both the top of the slab and the bottom of the slab; if it were so introduced, there would be too much risk that the cement hydrating at or near the top and bottom surfaces would seal against the exit of air from within. The infusing forces would be opposed by the developing air pressure within the slab until an equilibrium were established, and then no more water would infuse. If, however, the water is introduced at the bottom only, and if the top is exposed, then it is possible to sweep all the air upwards and out in advance of the infusing water. If the water is to be introduced at the top, then the bottom forms should be provided with vents of sufficient frequency and capacity as to enable the orderly exit of air in advance of the infusing water.

If a section of concrete of this invention is so thick that there is a possibility that the infusing waters might cause the hydrating cement to seal the water courses prior to complete infusion, then preferred practice of this invention includes introducing the waters of infusion from within the dry mix in a manner timed to permit the orderly exit of air. The use of such internal conduits for the infusion from within as will enable infusion along the length of the conduit, such as for example, a "stocking" of sand or the use of B-X cable, is in accordance with the proper exercise of this invention under these circumstances, when internal infusion is warranted or is otherwise desired.

If the section of concrete of this invention does not warrant internal infusion, and if infusion is to be from without and from a formed surface, such as for example, the face of a wall or the bottom of a slab, then a course to distribute the water along the face of the form or mold should preferably be provided. Water distribution courses such as those provided by corrugated or screened contact surfaces are examples of recommended practice of this invention.

If water is to be distributed along a free top surface, such as for example, the top of a slab, then it is to be expected that, initially, the compacted top surface will be slightly disturbed by the exit of air upwards (air being lighter than water). This undesirable disturbance can be inhibited, according to this invention, by surcharging the top surface with a load such as, for example, sand. A surcharge load will prevent the disturbance of the top surface of the concrete. As an alternative, the initially disturbed top surface may be recompacted while the mixture is plastic and the cement still has a significant portion of its hydration ahead of it. Very often, troweling of the top surface, after water has been infused from the top, provides the required amount of recompaction. A further alternative is to add water to the top surface sufficiently slowly to prevent the air near the surface from being trapped within the water and tending to bubble upwards rather than to exit downwards. Finally, these three alternatives can be coupled on any combination of any two or all three of them.

The proper compaction of the dry mix in the mold or forms prior to the addition of water causes the particles of cement to be contained within the void spaces that necessarily exist between the aggregate particles. Thus a separating film of either water or cement between the aggregate particles is avoided. Moreover, the dry mix aerates and flows almost like a fluid, enabling excellent in-mold definition even superior to a very wet mix. After compaction, the remaining void spaces are so small as to afford entry of only a small quantity of water, which comes in under the influence of capillary action. Very little more than the minimum required for hydration is used, and the process is self-metering.

An important feature of the invention is that the quantity of each size of aggregate used in formulating a dry-pour concrete of this invention is chosen so that each size range fits into the void spaces between the particles of the next larger size. Therefore, with proper proportioning of quantities, the most compact state of the dry-pour mix can only exist with no segregation, and the very act of compaction tends to create the correct unsegregated distribution of particles.

Dry mixes formulated and poured into molds in the manner stated above have yielded compressive strengths far in excess of what might be expected from the more usual wet mix formulations of the same cement content and same manner of cure. For example, laboratory test results shown in FIG. 13 were obtained from cement-aggregate mixes that included no chemical additives and there was no accelerated cure. This figure shows that 28-day compressive strengths of approximately 10,000 psi have been obtained for a nominal 7-sack mix, and strengths of about 11,000 psi for a nominal 8-sack mix. 28 day compressive strengths 12,000 psi have bee obtained for 10.5 sacks of cement per cubic yard, instead of the more usual 6,000 psi for a wet mix of the same formulation—an improvement of about 100 percent. Other dry mixes of this invention have given compressive strengths of 6,000 psi for 5.5 sacks of cement per cubic yard instead of the more usual 2,500 psi for the wet mix; and 5,000 psi for 5 sacks of cement per cubic yard instead of the more usual 2,000 psi for wet mix. The wet mixes described above are those formulated for 3 to 4 inch slump. This marked improvement in compressive strength is only one of the advantages of this invention. A considerable increase in tensile strengths also results. For the cement of this invention having a 12,000 psi compressive strength, a tensile strength in excess of 1,000 psi was obtained.

Particular note should be taken of the very high early strengths of concrete formulated in the manner of this invention. FIG. 13 also shows that compressive strengths in excess of 4,000 psi have been achieved for one day of non-accelerated curing for both the 7-sack and 8-sack mixes of this example. These strengths are far in excess of those attainable by the usual wet mix formulations of similar composition and subjected to similar curing.

A considerable increase in the flexural tensile strength occurs when this invention is employed to manufacture concrete. Hitherto unattainable flexural tensile strengths in excess of 1,000 psi for a nominal 6-sack mix and strengths in excess of 1,400 psi for a nominal 8-sack mix have been obtained, without using any chemical additives. FIG. 14 shows that remarkable one-day flexural tensile strengths of approximately 600 spi have been obtained without any accelerated cure of the beam specimens. This examples serves to illustrate that a distinct quality of high flexural tensile strength, which is not obtainable by similar formulations of the more usual wet mix methods, is obtained by the dry-pour processes of this invention.

Another noteworthy property is that the total included porosity for the dry-pour concrete of this invention is in the order of only 3.6 percent, which is almost an order of magnitude less than the porosity expected for conventional wet mixes. Consequently, the dry-pour concrete of this invention is virtually waterproof, approaching the permeability of a fired ceramic, which has 2 percent porosity. This quality is important for waterproofing, and it also enables painting without having to seal the concrete first and it imparts the ability to achieve a high-gloss finish with one coat of paint.

The as-poured molded surface of dry-pour concrete of this invention is smooth, and, when formed in a proper mold surface, the as-poured surface gives a virtually polished appearance, completely free of visible honeycombing and air bubbles, thereby distinguishing it from the undesirable honeycombed surface of a stiff wet mix. This surface quality is of particular interest when it is further recognized that immediately upon wetting, the dry-pour concrete of this invention has considerably greater strength than any possible wet mix, no matter how low the slump of the wet mix.

Since water is not added to the dry-pour concrete of this invention until the concrete mix is already placed in the mold and since no movement of the wet material is required, considerably more rapidly curing mixes, such as high-early-strength cement and solutions of calcium chloride in the water, (e.g., 8 percent solutions) may be used with excellent results. 5-foot-square panels, varying in thickness from ¾ of an inch to two inches with an average thickness of one inch, have been poured by this technique and, without heating or steam curing, were stripped from their forms and stood upright within ten hours of pouring—a time that by no means represents the lower time limit, for the time could have been substantially reduced.

Another very important result of the invention is that the dry-pour concrete of this invention is considerably more dimensionally stable than the conventional wet-pour concrete. For example, a normal wet-mix concrete shrinks considerably during cure, so that a cold joint cannot bond well. In fact, one normally expects such a cold joint to crack along the pour line. In contrast, thicknesses of concrete as little as a quarter of an inch have been patched with dry-pour concrete of this invention compacted in place against partially cured concrete, and the resultant structure appears to have suffered no reduction in strength through the cold joint. No crack or other characteristic readily distinguishes the patched areas.

The substantial reduction of both shrinkage and creep in the present invention results from the fact that substantially all of the aggregate particles are initially in contact with each other and upon the addition of water cannot be moved closer together by shrinkage in the cement or in the mix. The extreme lack of porosity and the stable particle arrangement enforced by intergranular contact prevents severe dimensional changes from occurring upon either the wetting or the drying of the concrete, and there is virtually no warpage in curing.

A theory which may explain these remarkable characteristics is offered, though the invention is not to be limited by such a theory. The results are obtained, whatever the correct theoretical explanation.

Consider an arrangement of granular particles, such as sand, in which every particle is in contact with one or more adjacent particles and in which the entire arrangement of particles is constrained so as to inhibit movement outward from the mass of the particles in contact. This may be accomplished, for example, by placing the sand in an infinitely rigid constraining cylinder 10, as shown in FIG. 1. Furthermore, consider that the column 11 of sand has been compacted to its most dense array so that further compaction—without fracture of the particles—is not possible. Such a column 11 of sand will then support a surcharge loading 12 without inelastic deformation, provided that there is no fracture of the particles in contact. In this case, the energy contributed by the surcharge loading 12 is stored internally and is available for use to effect complete elastic rebound when the surcharge loading 12 is removed.

The column 11 of particles in contact has some properties of a fluid, as can be seen by imagining the cylinder walls 10 suddenly removed. The column 11 of sand would then "flow" out from under the surcharge loading 12. Without lateral restraint, the column 11 of sand obviously has negligible strength. Thus, the strength of the column 11 of sand depends upon the quality of the constraining medium, in addition to the quality of the sand. If the cylinder walls 10 were to be thin and flexible, then the maximum surcharge loading 12 causing failure would be less than if the walls 10 were thick and rigid. The column 11 of sand can operate well as a structure if and only if the outward movement (flow) of the mass of particles is inhibited, thereby enabling transfer of load through the particles in contact.

The preceding description of the column of sand is compatible with the Mohr-Coulomb strength theory, first expounded by Coulomb in the year 1776. The Mohr-Coulomb strength theory as applied to granular soils takes into account that a certain relationship exists between normal stresses and shear stresses, such that when a permissible combination of such stresses is exceeded, failure occurs. This relationship is given by a Mohr envelope, as shown in FIG. 2. By plotting the confining pressure, the minimum principal stress $\sigma$, on the axis of principal stress, and then drawing a circle tangent to the Mohr envelope passing through this point and extending in the direction of increasing stress, the maximum prinipal stress $\sigma_2$ will occur where the circle crosses the axis of normal stress. The deviator stress $\sigma_2 - \sigma_1$ is the load carried by the soil structure.

Suppose the confining pressure $\sigma_1$ is increased to $\sigma_1'$. The tangent circle is drawn and $\sigma_2'$ is noted on the axis of normal stress. Note that an increase in confining pressure enables an increase in load-carrying capacity. That is, the deviator stress for the second case $\sigma_2' - \sigma_1'$ is greater than the deviator stress for the first case $\sigma_2 - \sigma_1$.

A second way of increasing deviator stress, i.e., the load carrying capacity of the sand structure, is to increase the angle $\alpha$ of the Mohr envelope. This is shown in FIG. 3, where $\sigma_2'' - \sigma_1$ is greater than $\sigma_2 - \sigma_1$ for the same confining pressure, $\sigma_1$.

A third way of increasing the load-carrying capacity of the sand structure is to build into the structure a shear capacity quite independent of the intergranular contact. This shear strength is marked $c$ on the ordinate of shear stress, and FIG. 4 shows that for the same confining pressure and slope of the Mohr envelope, the deviator stress $\sigma_2''' - \sigma_1$, is greater for that material with initial shear capacity than is the deviator stress $\sigma_2 - \sigma_1$ for the same material but without the initial shear capacity, The concrete material of this invention is composed of a compacted structure of granular material (which for the moment may be called sand, though applicable to all granular media) which depends heavily on the character and quality of the intergranular contact between particles. The cementitious material (portland cement is used as an example) serves to provide both a constraining force (confining pressure) and an initial shear capacity independent of the intergranular contact.

When the sand and cement is mixed dry, the cement (being many orders of size smaller than the sand) will most conveniently and most naturally fill the voids between the particles of sand, when the mixture is compacted to a dense array of the sand. The geometry of contact then taken is preserved after water is added for hydration of the cement, for the self-metering aspect of feeding the water by capillary attraction provides only that water which is needed to fill the remaining void spaces between the cement particles and this turns out to be little more than that required for hydration of the cement. The cement during its hydration period first expands largely filling it own void spaces, bonds itself to the particles of sand, and then contracts during the latter part of the hydration period. The contact force (or pressure) between the sand particles is increased due to this shrinkage of the bonded cement and to the disposition of the sand to maintain its geometry due to its already dense array. This prestressing of the sand structure provides the confining pressure indicated by $\sigma_1$, in the previous examples of the Mohr strength theory. The very presence of the cement binder itself also provides the initial shear capacity $c$ noted by the ordinate of shear stress in FIG. 4.

For the optimum execution of this invention, there should be the proper relationship between the quantities of sand and cement. If the mixture is such that the voids between the sand particles are not completely filled with cement, then opportunity for the largest possible initial shear strength $c$ and opportunity for the largest possible pre-stress of the sand structure has been lost. Such a condition of a lean mix (i.e., lean in cement content) precludes the optimization of the quality of high compressive strength, though it may be desirable for some other reason and though great improvements over conventional wet mixes are still obtained. It is also true that too rich a mix (i.e., rich in cement), which describes that condition where more cement is used than that needed to fill the voids, causes the particles of sand to separate and thereby destroys the effectiveness of the particle contact so heavily relied upon. For the usual case where the strength quality of the sand is superior to that of cement then both cement-to-cement contact and sand-to-cement contact are less effective than sand-to-sand contacts.

In the usual wet process for the manufacture of concrete, the particles of sand are forced apart by the water-cement phase in order to provide the workability required for the wet process. The strength advantage of intergranular contact of the sand is not inherent in the wet process and is not likely to be obtained. In addition, in the wet process, shrinkage of the cement due to hydration causes shrinkage of the concrete and dimensional instability. Shrinkage of the concrete in the dry process is virtually impossible because of the pre-determined structure and the keying by intergranular contacts.

As shown in FIG. 3, increasing the angle of the Mohr envelope increases the load-carrying capacity of the sand structure. As is well known in the field of soil mechanics, an increase in the angularity of the particles and the use of a well-graded mixture (i.e., one with many sizes of appropriate quantities), other things being equal, increases the slope of the Mohr envelope. It is reasonable to expect that for very dense angular well-graded sands the slope of the Mohr envelope will approach 45°. This angle is preserved in the dry process of this invention, since the structure does not change its geometry. The literature suggests that for concrete of the wet process of casting concrete, a slope of only 20° might reasonably be expected. This unfavorably low angle is due to the unquestionably poor state of intergranular contact.

The idealized Mohr envelope of failure may again be used to provide a theoretical explanation as to why large tensile strenghts occur as a consequence of this invention and why these tensile strengths increase with increasing cement content, — provided that the cement content is not so great that it would force separation of the sand particles in contact, thereby removing the strength derived from the intergranular contact of the sand particles, which is represented by the Mohr envelope of failure.

The solid lines of FIG. 15 describe an idealized Mohr envelope of failure and the Mohr circles which are compatible with this envelope. The broken lines of FIG. 15 describe a similar condition of compacted aggregates, with an increase of cement content being the only difference. Note that increasing the cement content while the other variables are held constant causes an increase in the initial shear capacity (the intercept on the shear stress axis) and in the shrinkage forces during the latter stages of the hydration. If the compacted aggregate particles are in intimate contact, then these additional shrinkage forces serve to further increase the confining pressure from $\sigma_1$ to $\sigma'_1$. It is noted that this would cause an increase in the compressive strength ($\sigma'_2 - \sigma'_1$), compare with ($\sigma_2 - \sigma_1$), and also, a rather significant increase in the tensile strength ($\sigma'_3 - \sigma'_1$), compare with ($\sigma_3 - \sigma_1$). In the prior-art wet process for making concrete, it is not possible to get the tensile strength attainable by this invention, because the shrinkage of the hydrating cement is not effectively resisted by the aggregates (which are not in intimate contact, but rather are separated by a coating of cement and water). As a consequence, little confining pressure ($\sigma_1$) is set up by the shrinkage forces. Study of FIG. 15 shows that as $\sigma_1$ approaches zero, not only does the compressive strength ($\sigma_2 - \sigma_1$) reduce, but so does the tensile strength ($\sigma_3 - \sigma_1$) and rather significantly at that. In the prior-art wet process, this condition of the confining pressure approaching zero exists, seriously inhibiting the development of load-sustaining tensile stresses.

In summary, this invention appears to provide a well-ordered, pre-determined and compacted structure of aggregate with voids filled with cement and with water fed by capillary attraction and/or hydraulic pressure after the placement of the other materials, and the resultant concrete can sustain remarkably high loads and possesses dimensional stability not known to the process of wet manufacture. In addition, the Mohr-Coulomb strength theory is applicable, so that predictions of quality of performance can be made, based upon laboratory study of the sand or other aggregate to be used in the basic structure. None of the above precludes the use of large aggregates to be added to the fine aggregate or to the sand-cement mixture discussed above.

The strength of the concrete cannot exceed the strength of the aggregate particles and, therefore, higher strength requires sound aggregate with adequate compressive strength. An angular shape, such as tends to result from crushing larger particles, leads to greater strength than a rounded shape occurring in older sand and rock where sharp points have been worn off. Furthermore, within a given stratum, there should be a variation in size, for the strength theory shows that such variation increases the slope of the Mohr envelope, thereby leading to greater strengths. Basically, greater angularity and greater size variation causes greater interlocking when the dry mixture is compacted, and hence greater resistance to deformation and movement.

For proper proportioning of aggregates and cement, it is necessary to create a compacted void volume in the aggregate structure approximately equal to the quantity of cement desired in the final mix. Adding additional cement requires proportioning aggregates so that the compacted void volume is adjusted to be large enough so as to properly receive the additional cement and yet preserve the integrity of the intergranular contact. In such a case it is possible to increase the strength of the final concrete product. However, adding that much additional cement which is in excess of the capacity of any compacted aggregate void volume to receive this additional cement, decreases the strength— for there is an excess of cement over the void spaces to be filled and the integrity of the intergranular contact of the aggregate structure is destroyed. For any particular distribution of aggregate sizes and shapes, there is an optimum cement content—that is densest in a compacted dry state and fills the aggregate voids. The optimum compacted aggregate structure lies in between the densest possible arrangement and the loosest possible arrangement.

Consider a container of dry cement subjected to a compactive effort composed of tamping, vibration or other mechanical means. For this cement there is a particular lower bound of volume to which any given quantity of cement will compact. This lower bound is a stable figure which is a consequence of the equilibrium established between (1) the tendency of the particles to draw closer due to the mechanical effort expended during the compaction process, (2) the tendency of the particles to spread apart due to the air pressures in the voids (aeration) during the compaction process, and (3) the geometric and frictional impedence to both contraction and expansion in the neighborhood of this state of equilibrium. This particular equilibrium point will be called herein the "most dense array," and it lies between the theoretical "dense pack" and theoretical "loose pack" arrays of spheres in contact. For example, the specific gravity of the most dense array of Type I cement was found to be in the neighborhood of 1.8

The quantity of cement which fills the voids of the fine aggregate so that the cement is in the most dense array is the quantity which aids in maximizing the strength of the finished product. When designing a mix for maximum strength, it is an object of this invention to approach this most dense array for the cement in the voids of the fine aggregate. It is compatible with the strength theory of this invention that this will develop maximum shear intercept (FIG. 4), and maximum confining pressure, $\sigma_1$, of the fine aggregates due to shrinkage of the hydrating cement after the infusion of water. Friction at the interface between the fine aggregates and the cement will act to impede the realization of the most dense pack of the cement during compaction. It therefore becomes desirable to minimize this frictional impedence, and this may be accomplished by a number of methods. One method is to remove the smaller particles of fine aggregate so that large void spaces (with fewer opportunities for surface contacts) result. Another method is to design a mix such that the volume of voids in the fine aggregates which is filled with cement is large enough to permit compaction of the dry cement to a point approaching its most dense array and yet preserve the integrity of the particle contact of the fine aggregates. Reflecting again on the strength theory of this invention, enlarging the void space of the fine aggregates will flatten the slope of the Mohr envelope, thereby reducing the load carrying capacity. However, this disadvantage may be partially or fully offset by increasing the opportunity for approaching the most dense pack of the dry cement, thereby increasing the load carrying capacity. The amount of increase of void spaces in the fine aggregate which will produce the optimum strength (load carrying capacity) depends upon, among other variables, the compactive effort, the distribution of sizes of fine aggregate, the surface texture of the aggregate, and the type of cement. It has been found that when a washed and dried Del Monte sand was used with the following proportions:

| | |
|---|---|
| 26.5 No. | 16 mesh |
| 26.5 No. | 20 mesh |
| 26.5 No. | 30 mesh | that 34.5 of Type I cement provided optimum voids in the structure of fine aggregates. This volume of voids is approximately 25 percent greater than the volume of the voids when the sand is compacted to its "dense pack" state and is less than the volume of voids in the sand where the sand is in its "loose pack" state. Example 1: To show that the optimum arrangement of a compacted aggregate structure lies betweeen the densest possible arrangement and the loosest possible arrangement.

Cement and a sand aggregate were chosen, having the following specific gravities:
Specific gravity of the well-graded compacted sand aggregate in its most dense arrangement = 1.65
Specific gravity of the well-graded compacted sand aggregate in its most loose arrangement = 1.40
Solid specific gravity of the sand aggreate = 2.50

Three dry mixtures were then made, as follows:
Mixture A: 1 part cement, 1 part sand (by weight)
Mixture B: 1 part cement, 2.25 parts sand (by weight)
Mixture C: 1 part cement, 3 parts sand (by weight)
By calculation, Mixture A was found to have the following volume relationships:
Volume of voids of compacted loose arrangement = 0.32 units
Volume of compacted dry cement = 0.61 units
Thus, in Mixture A there is a substantial excess of cement over the void space available to receive this cement. The ratio of the volume of the cement to the total volume was 66 percent. This mixture was tested and found to have a compressive (28 day) strength of only 2,800 psi.

By calculation, Mixture B was found to have the following volume relationships:
Volume of voids of compacted sand (40 percent) = 0.61 units
Specific gravity of compacted dry cement = 1.58
Specific gravity of compacted sand = 1.49
In Mixture B, the specific gravity of the sand lies in between the loosest arrangement (1.40) and the densest arrangement (1.65), and all the voids are just filled with dry compacted cement. Tests showed that the compressive strength (28 day) of this Mixture B was 10,000 psi.

By calculation, Mixture C was found to have the following volume relationships:
Volume of voids of compacted sand (34 percent) = 0.62 units
Specific gravity of compacted dry cement = 1.37
Specific gravity of the compacted sand = 1.65
The specific gravity of the sand in Mixture C lies at the densest arrangement, and all the voids are essentially filled with compacted dry cement. The compressive strength (28 day) was found by test to be 5,200 psi.

Example 1 thus indicates that a gradual increase in strength is to be expected with increase in cement content, as long as the sand aggregate forms a competent compacted structure. When the loosest possible arrangement of sand structure is no longer possible and intergranular contact is compromised, a decrease in strength follows even with an increase in cement content. These results show consistency with the strength theory of this invention. For, when the integrity of the intergranular contacts of the aggregates is compromised, the effect is to markedly decrease the slope of the Mohr failure envelope and, as previously discussed, to decrease the deviator stress, which is the measure of the failure load. By increasing the void volume and yet keeping the integrity of the intergranular contact of the sand, although the slope of the Mohr envelope may decrease slightly, the effect of the added cement at increased density is to increase the initial shear stress intercept (shown in FIG. 4 as $c$ on the ordinate axis) as well as to increase confining pressure $\sigma$, of the aggregates in contact due to increased shrinkage forces of the cement gel. Both these effects of the additional cement add more to the deviator stress (the measure of failure load) than the slightly flatter slope of the failure envelope detracts from the deviator stress. The net result is to show an increase in load-carrying capacity, which is indicated graphically in FIG. 8, a plot of the results of this example. Example 2: To show that increasing the quality of intergranular contact increases the strength of the resulting concrete product.

The literature of soil mechanics shows that sand aggregates of uniform size will not have as steep a slope for the Mohr failure envelope as will a well-graded mixture of the same sand, other things being equal. Therefore, because the well-graded mixture is known to have a higher quality of intergranular contact, as a soil, then it is predicted by the theory discussed above that the well-graded mixture will produce a higher-strength concrete. This is borne out by the information supplied in the table below. The source of the sand aggregate was the same in both cases. The compacted dry density of the cement was constant for the tests of each case.

| Case | % Voids (completely filled with compacted cement) | Compressive strength (28 day) psi | |
|---|---|---|---|
| | | Well-graded sand | Uniformly graded (20-30) sand |
| D | 34 | 5,200 | 3,700 |
| E | 40 | 10,000 | 7,600 |

Example 3: The following example is offered to illustrate that the compressive strength of the concrete of this invention is improved with increasing slope of the Mohr envelope of failure (a measure of the quality of intergranular contact). Tests were conducted on three different types of sands to determine the Mohr envelope of failure under similar conditions of compaction. All other variables such as quantity and type of cement, size and shape of sample, compaction of dry material, technique of curing, etc., were kept constant, so as to effectively isolate the variable of interest — the slope of the Mohr envelope of failure of the sand phase. The three sands used were an Ottawa 20/30, an Amador 70, and a well graded Silica. The results are charted on FIG. 16 and clearly demonstrate the principle that as the slope of the Mohr envelope increases so does the compressive load-carrying capability of the concrete of this invention. Example 4: To show that when other considerations are kept constant (including the volume of voids in the sand aggregate), that the strength of the finished product of concrete increases with increasing specific gravity of the dry compacted cement.

Four mixtures were used, differing only in the specific gravity of the dry compacted cement as follows:

| Mixture | Specific gravity of dry compacted cement (identical cement except for compaction) | Compressive strength in psi (7 day) |
|---|---|---|
| F | 1.16 | 2,260 |
| G | 1.37 | 3,140 |
| H | 1.48 | 4,200 |
| I | 1.54 | 5,360 |

The specific gravity of the dry compacted cement is related to the amount of water that can be absorbed by capillary action. Excluding absorption of water by the aggregates, the amount of water which may be admitted by this dry pour and subsequent wetting process can be more than the space between the particles of cement. The greater the specific gravity of dry compacted cement, the smaller the volume of void space between the cement particles, and hence, the smaller amount of water admitted. Consequently, the denser the compacted dry cement, the smaller the quantity of water admitted and, therefore, the lower the water-cement ratio. The water-cement ratio is a significant parameter which relates to the strength of concrete. The lower the water-cement ratio, the greater the strength, — other things being equal. Whereas, in the usual process of manufacturing wet mix concrete, water-cement ratios are rarely less than 4 gallons per sack of cement — and this ratio is achieved only by reducing workability, surface smoothness and form definition — the concrete of this invention can achieve water-cement ratios less than 3 gallons per sack of cement without such negative factors. This low water-cement ratio does not introduce the likelihood of marred surfaces due to trapped air, as it does in the wet process. FIG. 17 illustrates the improvement in compressive strength of cement-fine aggregate-coarse aggregate concrete of this invention with reduction in water-cement ratio. The low water-cement ratios obtained and the related high compressive strengths are not possible with prior-art concretes of the same material formulation. In addition these qualities are obtained with the same excellent form or mold definition discussed in other parts of this specification.

That which is true for the proportioning of cement to sand (fine aggregate) is likewise true for the proportioning of fine aggregates to coarse aggregates (rock). If the cement sizes are completely telescoped within the sand-size voids and completely fill these voids, and if the sand sizes are completely telescoped within rock-size voids and completely fill these voids, then the quantities which result can be adjusted to achieve optimum proportions for maximum strength. That quantity of rock, — which when compacted to the state of inter-rock contact but which admits large quantities of mortar which completely fill the voids but do not over-fill them — approaches the optimum quantity.

The dry mixture of aggregate and cement acts in many ways like a fluid. The segregation of the aggregate particles can be thought of as representative of a phenomenon very similar to, and analogous to, solids suspended in a fluid. If they are small enough, the viscous drag of forces on the particles predominant over dynamic or buoyancy forces, and the mixture acts in a manner analogous to a colloidal suspension. During normal mixing and handling, if the aggregate and cement are reasonably close to the same density there is no segregation except at the free surface.

The free surface of the dry mixture has an effect not unlike surface tension of a liquid. An aggregate particle near the surface, when some form of agitation exists, has a certain probability of being moved to the top of the free surface. Because of the analogous apparent surface tension, the probability of the particle re-entering the surface is less than the probability of its leaving the mix. Therefore, for any given mixture of sizes of aggregate, there is a sort of scum of free particles of aggregate created on the surface. The total number of particles of a given size on the surface remains nearly fixed and is equal to the quantity required to overcome the lower probability of the particle re-entering, and thus a state of equilibrium exists. Since this is a surface phenomenon, then the mix immediately below the surface lacks somewhat that amount of aggregate resting on the surface. Therefore, the act of compaction tends to restore the mixture to the proper state.

The dry mis is, therefore, quite free from segregation problems so long as the surface "scum" is not removed. If the material is allowed to flow down a long open chute, whose angle of fall is steeper than the angle of repose of the aggregate on the surface, the aggregate on the surface will outrun the mixture and the true segregation tends to occur. The same effect occurs from material being poured from a spout and allowed to build up, forming a cone, sides of which have an angle greater than the angle of repose.

These problems can be overcome by limiting the chute angle to no greater than approximately 30° above horizontal, the precise angle depending on the angularity and size of particle. For angles greater than this, a closed conduit made to run full, having no free-surface, is also an adequate solution. In pouring into the mold, care must be taken not to build up a cone or mound with sides there are too steep. If a storage vessel is to be used, then it should be filled from one side at the top and removed from the opposite side at the bottom, or it should be slightly agitated or some other provision made, such as a desegregation cone in its bottom.

Thus, though some segregation is possible, proper handling can and does largely eliminate it. In any case, the presence of the dry cement drastically reduces the degree of segregation that would be found in handling the dry aggregate by itself.

In the design of a mix for the dry-pour technique, two competing alternatives must be considered and evaluated for maximum efficiency. A mix whose sizes are such that, during the act of compaction, the cement-size particles are telescoped completely within the void space of the sand-size aggregate and the sand-size particles are telescoped completely within the void spaces of the rock size aggregate will be relatively more costly for compaction and relatively less costly for cement than a mix, designed for transportation and placement, without segregation except for surface scum. Example 5:

Mixture J: Telscoping sizes - moderate compaction required.
  A mixture of 1 part cement - Type II, 2 parts sand and 4 parts rock (¼ inch — ⅜ inch) made according to this invention, developed a compressive strength (28 day) of 6,100 psi. The cement content was 6.4 sacks per cubic yard. Mixture K: Transportable without segregation -
  light compaction required. A mixture of 1 part cement - Type I, 2.3 parts sand, and 2.77 parts rock (¼ inch—⅜ inch), made by the process of this invention developed a compressive strength (28 day) of 5,000 psi. The cement content was 7.4 sacks per cubic yard.
  In Mixture J, the cost of the moderate compaction would be offset by the savings in cement. In Mixture K, the cost of additional cement would be offset by the savings in compaction cost.

The capillary forces are considerable, and the water, once exposed to a surface of the concrete in its dry form, can be raised a considerable height. With the entry of the water, a potential difference is developed, which forces the air to the free surface of the dry mix. There is, therefore, considerable latitude in the manner in which the water is added, so long as the hydration rate is not accelerated so rapidly through the use of high early cement, calcium chloride, not water, etc., that the capillary passages are shut off by the expanding cement gel before the addition of the water is complete. If the water is added to the upper surface, this surface may have to be troweled or brushed subsequently, for appearance sake. If the water is added through internal tubing, the surface can be brought to a smooth troweled finish prior to the addition of water.

The process of adding water is self-metering, in that the void spaces can hold only the right amount of water. So long as the water is not added with sufficient turbulence to form a wet mixing action, the process may be speeded up by raising the pressure on the entering water. This pressure must, however, be sufficiently low so as not to disturb the pre-formed intergranular contact of the compacted dry-pour. The process may, of course, also be speeded up by increasing the number and area of entry points for the water.

The self-metering aspect means that no consideration need be given the porosity or hydrophilic nature of the aggregate. This, coupled with the fact that the water is not added until after the concrete is placed, gives considerable additional advantage to the process beyond the achievement of the better properties.

The second aspect of this invention is of use where it is desired:

1. to maximize or minimize the strength of a given or specific formulation of component materials, or
2. To minimize ormaximize the segregation of the component materials in a given or specific formulation, particularly where there is a difference in densities, or
3. to maximize a quantity of one or more of the component materials weaker in strength than the other components, while a minimum decrease in strength of the resultant composite product is desired, or
4. to significatantly alter one or more of the properties or qualities of a composite cementitious material, or
5. to minimize the quantity of one or more of the strong component materials or the cement within a minimum decrease in strength.

The essence of this aspect of the invention is to form a predetermined ordered structure within and between the various size ranges of particles or strata so as to maximize or minimize, whichever is desired, some property, such as strength. This is accomplished through the selection of particle size, the selection of specific quantities and proportion of these particle sizes, and the selection of component materials.

Thus, if the segregation of a very lightweight component is to be prevented, then, in accordance with the practice of this invention, one of the following may be done:

a. The lightweight particles may be made small enough so that the forces of viscous drag exceed the apparent buoyancy forces in either a wet or dry mix.

b. The size and quantity of lightweight particles may be chosen so that they fit completely within the void spaces between particles of a larger and heavy kind, and the quantity and proportion of the larger particle size may be chosen so that the larger particles touch each other in the completed mix. This means that the lighter particles would have to shove aside the heavy particles in order to segregate — an unlikely event.

The quantities of smaller particles determine the spacing of the larger particles. If that spacing is chosen such that, in the compacted mix, wet or dry, the particles all touch; then a compressive force must pass through them. If these particles are either the strongest or weakest component materials, the strength is, respectively, greatest or least.

A number of component materials have been added to concrete such as sawdust, phenolic and other microballoons foamed silicia, foamed polystyrene, and foamed ceramics. The theory of the invention has been tested with each of these materials and has been borne out by all the mixes.

Densities as low as 80 pounds per cubic foot, depending on the lightness of the particles added, have been obtained with compressive strengths of approximately 4,000 psi. Young's modulus has been reduced by an order of magnitude. Shrinkage has been both increased and decreased, according to what is desired. Densities as low as 50 pounds per cubic foot, with 1,500 psi compressive strength have been achieved. Porosity has been both increased and decreased, according to what may be desired. Machinability has been increased to a point where the concrete can be cut with a carpenter's saw or threaded on a lathe with the normal high-speed tool bit shaped for the cutting of steel.

Many other properties may be drastically changed by practicing this phase of the invention. For example, the nuclear shielding properties may be improved. As another example, brighter colors may be obtained through the addition of larger quantities of pigment. In another instance, forty percent of the cement specified in a given mix has been omitted while retaining 80 percent of the original compressive strength. In other instances, particles in densities as low as one-half pound per cubic foot have been added and contained in the mix without segregation.

Concrete normally consists of four components: coarse aggregate, fine aggregate or sand, cement particles, and water. In the usual wet mix, the sand is at least partially contained within the void spaces of the coarse aggregate. The cement particles, are at least partially contained within the void spaces of the sand. The excess water is at least partially contained within the void spaces of the cement. The spacing between the particles of a particular component is defined by the total volume assumed by the smaller-particle components. In the particular case where there is no smaller-particle component, the component will compact to a point where all of its particles are touching. Depending on the amount of compaction, the form of structure achieved will vary. Perfect spheres, all of the same size, can exist in structurally stable arrays where there can be as much as 48 percent void space and as little as 28 percent void space. These are referred to herein as loose pack and dense pack, respectively. A normal aggregate is not and preferably should not be perfectly spherical, nor are all of the particles of a given component of exactly the same size. Consequently, the approximate usual percent of void space for a dense pack is 35 percent and for a loose pack 55 percent. These exact percentages, of course, may vary considerably.

When concrete is mixed with water in the normal wet mix, a paste is formed between the water and the cement; this paste coats all of the particles with a certain minimum coating, depending on the wetness of the mix. Thus, in a normal wet mix, the cement is never wholly contained within the void space of the aggregates. A compressive load through a cured wet mix concrete must, therefore, in part be assumed by the cement.

Cured Portland cement, even packed as dryly as possible, may sustain a compressive load of only approximately 2,800 psi. We have discovered that when flexible particles (such as resinous microballoons) of approximately the same size and size distribution as the cement particles and almost no structural strength are mixed with cement in various proportions, surprising results are achieved. Cement in its normally packed density of 94 pounds per cubic foot contains approximately 50 percent void space and is, therefore, nearly in a loose packed condition. (Because of the large specific surface area and the adhesion to air molecules, the cement can, of course, be aerated to a much lower density, but the very fluidity of aerated cement particles comes from the face that the particles are not in contact with each other, and this condition does not constitute a true pack.)

What we found is that when, by absolute volume, a wet mix of 10 percent flexible particles of the same order of size and of insignificant structural strength and 90 percent cement is cured, the structural strength is reduced below the 2,800 psi of the cement above. However, as the percentage of flexible particles increases to a point of approximately 40 percent to 60 percent, the compressive strength increases to a peak at this point of 3,500 psi, a magnitude greater than the undiluted strength of the cement. As the amount of flexible particles is further increases, the strength bdgins to diminish, quite rapidly after there were 60 percent flexible particles reaching a point of almost no compressive strength with close to 100 percent flexible particles. Tests have been made with phenolic microballoons, foamed silica and foamed polystyrene. The curve in FIG. 9 describes these results in more detail.

These results can be explained by two different factors. The first is that the structure formed at peak strength is approximately that of a loose pack, with every other particle a structural cement particle and the balance the non-structural flexible particles as illustrated in FIGS. 5 and 5A. In this array, the transmission of the compressive force from the upper surface down can be achieved in a balanced condition through the cement particles, so that none of the particles have an unbalanced component, causing shear stress. Contact is achieved between the cement particles through a non-point of tangency because of the swelling of the cement during early hydration.

A denser pack, as shown in FIGS. 6 and 6A, would assume a geometric confiruation such that the forces would be unbalanced and failure planes would develop at the interface between the strong and weak particles. Had the quantity of microballoons been greater than that shown in FIG. 5, concentration of weaker particles would cause unbalanced — thereby weakening the structure. These considerations of particle quantity and arrangement indicate why the strength of the mixture peaked at a particular quantity of microbaloons. The use of fewer microballoons causes unbalance and hence shear forces, as shown in FIGS. 7 and 7A. The use of more microballoons reduces the total quantity of cement available to assume compressive load and increases the likelihood of two adjacent particles being both weak particles.

The above considerations of the form of the structure does not, however, explain the apparent increase in compressive strength of the cement. This increase appears to be due to a second factor, namely the shrinkage of the cement during the last stage of cure. The initial paste of cement and water settles, releasing some of the free water, while containing the balance to form what is called the gel. The volume of the gel is greater by far than the original volume of the cement particles (absolute volume), and it is greater than the final volume of the fully hydrated cement, since the volume of cement plus free water is reduced as they chemically combine.

In the early stages of hydration, the cement gel is not structurally sound and cannot exert appreciable forces. Thus, the initial expansion due to the formation of the gel takes place largely by filling the void places initially existing between the cement particles. However, as the gel becomes more structurally competent, the hydration has usually reached the stage where the cement gel begins to shrink. Whether or not there is aggregate present, the initial particle structure (such as the cement particles themselves in contact with each other) resists any shrinkage. The resistance to the shrinkage causes the cement to be preloaded or prestressed in such a manner that the additional capacity of the cement to support a compressive load is significantly reduced.

In the structure of FIGS. 5 and 5A the very limited bearing capacity of the flexible particles enables a uniform shrinkage in all directions without a significant prestressing of the cement. This structure and this effect are quite important. From it three important points follow:

1. To maximize the compressive strength of concrete, the cement should not be required to bear a compressive load. Rather, the more competent sand structure should be relied upon to perform this task. This is the basis of the strength of our dry-pour concrete.

2. If a desired structure requires the cement to bear load, then the cement should be allowed to shrink without excessive preload caused by inhibiting much of the shrinkage at the microscopic level.

3. Since the sand and coarse aggregate have many times the compressive load-carrying ability of the cement even when unprestressed, then, using a structure like that shown in FIG. 5, nearly half of any given component of the aggregate can be replaced by non-structurally bearing particles without significant reduction in strength, provided that either the non-structural particles or other particles added in some other component substantially let the cement shrink without preload. In the case of the aggregate, the load transmits from particle to particle, as shown in FIG. 5, through the components having smaller particles and in the case of sand, through the cement itself.

Theeefore, the results indicate the desirability of a dense pack for maximum strength when the particles of any one size are of uniformly high strength and the desirability of a loose pack if there is a mixture of strengths of particles of the same general size. Further, where a mixture of strengths is used, to maximize the strength, approximately 60 percent should be of high strength in order to reduce the probability of two weaker particles touching.

Acceleration of the rate of cure tends to cause increased shrinkage of the concrete, and when acceleration is used in the process of this invention such shrinkage leads to improvement in the flexural, tensile, and compressive strengths of the concrete.

For example, calcium chloride, when used as an additive to accelerate the rate of cure, tends to improve the flexural tensile and compressive strengths of the resulting product. In this process, as well as in the prior art wet process, the use of calcium chloride will increase the amount of shrinkage when curing. For example, the use of 3 percent calcium chloride (by weight of water) increased the 28 day shrinkage by 45 percent for a mortar mixture of 25 percent cement (Permanente Type II) and 75 percent Felton C-33 sand. FIG. 18 illustrates that with increasing shrinkage, the compressive strength increases significantly. Likewise, FIG. 19 illustrates that with increasing shrinkage the flexural tensile strength increases.

The fact that an increase in shrinkage produces an increase in both tensile and compressive strength is consistent with the theory of this invention as previously developed. FIG. 20 again shows an idealized Mohr envelope of failure. Due to the shrinkage of the hydrating cement, $\sigma_1$ represents the prestress acting on the sand particles in contact due to this shrinkage. The deviator stress ($\sigma_2 - \sigma_1$) represents the compressive strength and ($\sigma_1 - \sigma_3$) represents the tensile strength. When calcium chloride is added $\sigma_1$ increases to $\sigma_1'$, due to the increase of shrinkage forces acting on the sand particles in contact. As shown, the compressive strength shows an increase ($\sigma_2' - \sigma_1'$) over the previous ($\sigma_2 - \sigma_1$). Likewise, the tensile strength ($\sigma_1' - \sigma_3'$) shows an increase over the previous ($\sigma_1 - \sigma_3$). The theory predicts an increase in both compressive strength and tensile strength. The theory also predicts that the increase in compressive strength is greater than the increase in tensile strength. Examination of FIGS. 18 and 19 shows experimetnal verification of this theory.

Practice of the invention gives the ability to maximize or minimize shrinkage, to increase strength by taking the cement out of bearing, and to add particles of many different kinds of material without regard to their structural properties while yet maintaining high compressive strength, provided the resultant mix does not segregate and is sufficiently pourable. Depending on the quantity of a non-structural material to be added, the strength required, and the differences in densities involved, there are many mix formulations which can satisfactorily be used. Limitations are imposed by the nature of the wet mix, and results are improved when the dry-pour technique is employed. In particular the 3,500 psi compressive strength of the wet mix of 60 percent cement and 40 percent flexible particles increased to 4,700 psi when the dry-pour technique of this invention was used.

Normal aggregates and cement may be used, and different component materials added when a particular property is desired to be changed and where the normal component materials do not contain that property. When high strength is desired in hydraulic concrete, the normal aggregates are capable of taking high compressive loads, and no other material is required. If tensile strengths higher than those achievable by improving the ordered structure are desired, new materials, such as epoxies, other resins, or fibers, may be added.

When light weight is desired, normal aggregate is replaced, at least in part, by other materials of similar size but lighter weight, such as foamed silica, foamed ceramic, phenolic microballons, foamed polystyrene, sawdust, or wood flour. Depending on the structure created, the addition of this material is also useful for increasing shrinkage or reducing Young's modulus. Many sawdusts are sufficiently fibrous in nature and sufficiently light in density to make a good material for reducing weight or, because of the fibers, increasing tensile strength.

Porosity may be reduced by using the dry-pour technique of this invention, and, through it, obtaining the most compact mix. Further reduction in porosity is achievable by using materials, such as silica flour, with particle sizes in the order of less than one micron in diameter. This size of particle fits into the void spaces between the cement particles, and, so long as the quantity used does not reduce the water content in a dry-pour below that needed for hydration, the porosity can be reduced below the 3.6 percent porosity that has been achieved without the use of this size particle. When it is desired to color the concrete, most pigments are of a similar size range, and they can therefore also be used to reduce porosity.

When organic materials, such as sawdust, cotton linters, or hemp and sisal fibers are used, care must be taken that possible deleterious content of the organic material does not weaken the cement. A concrete containing organic material is probably best used in an interior application, since the wetting of the concrete could accelerate the attack on the cement. The damage may be reduced by presoaking the organic material in a waterproofing material or in sodium silicate. The reaction of the lime content in the cement with the sodium silicate tends to petrify the organic material. Of additional advantage is the inherent low porosity of the dry-pour process, significantly inhibiting the wetting of the concrete.

The cement itself can be diluted with other particles without significantly reducing the strength. The choice of particles used is dependent on the structure of the concrete employed. Thus, where the structure requires the cement strata to bear uniaxial compressive load, particles of the same size but of little strength can be added so as to reduce residual preloading of the cement, and, becasue of this, gain sufficiently to make up for the reduction in cement. For purpose of economy, it may be desirable to substitute a hard particle for some of the cement in order to preserve some of the properties best supplied by hard and unyielding particles. For maximum efficiency of such a substitution, the particle selected should be of the same order of size as the cement particle and bond well to the cement. An example is ground limestone which has not been fired in a kiln and is thus fully hydrated. Even in a structure where the cement bears compressive load, up to 40 percent of the cement particles may be replaced bt fully hydrated ground limestone while retaining 80 percent or more of the strength.

When a significant improvement in tensile strength is desired, an epoxy resin or other glue may be added to the cement. When this has been tried in a wet mix, using a liquid form of epoxy, the epoxy coated the cement particles and significantly inhibited the curing of the cement. The advantages of the greater strengths similar to those achieved in the dry-pour process are not then realized. According to the present invention a dry-pour with a reduced cement content, so as to produce a porous concrete, could be followed after curing by spraying the surface with a liquid epoxy or other synthetic resin, preferably under pressure. This technique causes the resin to penetrate and produce high tensile strength on the surface sprayed. Thus, in a normal beam, where a high tensile strength is required on only one surface, the opposite surface being in compression and the center being close to the neutral axis, the quantity of the costly resin can be significantly reduced and the curing of the concrete left unimpaired while still improving the tensile strength where improvement is needed. Another way of incorporating resins is by addition to the dry-pour concrete mix of powdered dry resins or glues. These resins or glues could be water soluble or activated after curing of the cement with some other solvent or activator.

By predetermining the appropriate structure, segregation due to differences in densities can significantly be reduced. The basic mechanism is to hold the lighter particles down with the weight of the heavier particles or in some cases with an external restraining force. Where there is a mixture of light and heavy particles within a given particle size range, a structure with the particles all approximately in contact, and where there are approximately half of each density, the lighter particles cannot rise without lifting the heavier particles enough to spread them sufficiently apart for escape of the lighter particles. Conversely, the heavier particles are equally restrained from sinking.

Where the particles of one size range are all lightweight particles and the next larger particles are heavier, the heavier particles may be used to restrain the lighter, smaller particles. The spacing of the larger particles should again be such that they are appoximately touching, and the size should be sufficiently larger so that the smaller, lighter particles fit within the void spaces between the larger particles. In this case, it is possible for the smaller particles to rise without spreading the heavier particles, but they cannot rise in a straight line; they would have to travel in a series of curved paths provided by the void spaces between the larger particles.

The tendency of larger particles to segregate from smaller ones at the free surface under agitation is reduced in a wet mix, because the cement paste has a much greater apparent viscosity than the dry aerated cement powder. However, the floating to the surface of lighter particles just below the free surface is possible in a wet mix. This tendency to segregate increases as the mix gets wetter. Consequently, much better results with much less segregation can be achieved by using a dry-pour. In a dry-pour, the aerated mixture of cement and sand is sufficiently fluid so that with some vibration it can pour through a bed of large aggregate whose void spaces are large enough to permit the passage of the sand particles. Therefore, in the case where the largest aggregate is of very low density, another mechanism is preferably employed to prevent segregation. The mold can be filled with the largest size aggregate and that compacted and restrained from any upward movement by a screen across the top of the mold. The cement and sand mixture under vibration can then pour down into the mold flowing through the opening in the screen and the void spaces in the aggregate.

Thus, some of the properties of concrete can be greatly altered. Increase in the strength, the strength-to-weight ratio, and reduction of the density are the property alterations with the greatest application and interest. The potential reduction in dead weight load that results may approach cost reductions of fifty percent in a large structure.

A number of other property alterations are less obvious but are quite significant. These include changes in internal porosity, reductions in strength, changes in Young's modulus, changes in the tendency to segregate, changes in machinability, increases in dimensional stability, increases in shrinkage, and increases in form definition.

The internal porosity can be reduced to a point where the concrete becomes virtually waterproof. Roofing panels, beams, and tiles can, therefore, be made with an overlapping structure so as to naturally shed water from the edge of a roof or into gutters. Advantage may thus be taken of the structural strength of the concrete, while the need for normal roofing material and any additional waterproofing is eliminated.

Reduction in porosity also enables painting without first applying a sealing coat, and a full gloss finish can be obtained from a single coat of paint.

When increasing porosity, liquid glues or resins may be added later, in order to obtain greater tensile strengths or such architectural effects as a plastic surface well bonded to the concrete under surface. Also, by increasing porosity sufficiently porous filters can be made.

Reduction of strength may also be advantageous where one desires a temporary structure that is eventually to be removed or a frangible mold removed after casting by breakage.

Increasing Young's modulus and making it more linear can not only be useful but can significantly improve the ability to mathematically analyze a complex structure.

Surface segregation may be used to produce exposed aggregate finishes automatically and to minimize the quantity of more expensive aggregates used in the exposed surface. Similar techniques may also be used to concentrate lightweight low-strength aggregates at the neutral axis of a beam or wall panel so as to give an average low density, while the highest strengths are at the outer surfaces where they are needed.

Generally, increased machinability is connected with a reduction in density. Machinable concrete can be produced. By using the dry-pour technique, areas or surfaces of an otherwise high-strength concrete structure can be made machinable with a good bond to the remainder of the structure. Areas can be made drillable, for bolting in the field, or entire pieces can be made so that they can be cut with a carpenter's saw.

Conversely, by proper formulation, considerable improvement can be made in the abrasive and wear resistance of a concrete surface.

Increases in dimensional stability enable the construction of the equivalent of granite surface plates from concrete using a granite aggregate. The properties obtainable from granite may be improved or otherwise altered by using a portion or all of some other aggregate material. In any case, improved dimensional stability means the ability to produce identical pieces on a production line, free of problems of shrinkage, shrinkage cracks, and warpage.

Shrinkage can be increased or decreased by practice of this invention; in short, it can be controlled. A composite beam with low-shrink upper and lower surfaces and high-shrink (and possibly low-density) core can be cast by the dry-pour technique of this invention, to result in a beam with prestressed surfaces in compression with high strength, and a low-density but adequate shear-transfer strength area around the neutral axis. Thus, it becomes possible to produce a composite beam or panel of greater strength-to-weight ratio than heretofore achievable, prestressed so as to facilitate the carrying of large flexural loads, all as a part of the casting and curing process and without the use of expensive additional labor and materials or the need for a special mold capable of providing restraint. Example 5: To show the manner in which lightness in weight may be effected and yet improve the flexural capability by a novel method of prestressing, and to show another means of achieving lightness in weight and comparing strength to weight ratios.

All the beams described in this example have a gross cross-section of 3 1/8 inches × 3 1/8 inches and a length of 32 inches. Each of them is placed on simple supports 30 inches apart, as shown in diagrammatic manner in FIG. 10, load P placed at the midpoint of the span. There is no reinforcement for the beam.

Beam 1 was made in square solid uniform cross-section of 3 1/8 inches on each side and was made from Mixture L, as follows:

| | |
|---|---|
| Type I cement | 34.5 pounds |
| 16 mesh sand | 26.5 pounds |
| 20 mesh sand | 26.5 pounds |
| 30 mesh sand | 26.5 pounds |

Calcium chloride, 5 percent by weight of the water used when the dry mix was set by capillary action. On test, as per FIG. 10, the flexural stress at failure was 1,080 psi. The Unit weight of Beam 1 was 145 lbs./cu.ft., and its Strength-to-weight ratio was 7.45.

Beam 2 was made from two different materials, Mixtures L and M, its cross-section being shown in FIG. 11. Mixture L was the same as was used for Beam 1. Mixture M was as follows:

| | |
|---|---|
| Type III cement | 15.0 pounds |
| Phenolic microbaloons | 15 ounces |
| Polystyrene expanded pellets (Sp. Gr. = 0.039) | 2 ounces |

The Beam 2, when tested had the following qualities:
Flexural stress at failure 1,310 psi
Unit weight of beam 103 lbs./cu.ft.
Strength-to-weight ratio 12.7

Beam 3 was solid, like Beam 1, but was made from the following Mixture N:

Type I cement/phenolic microballoons (60/40 volumetric proportions 0.334 cubic feet)

| | |
|---|---|
| 16 mesh sand | 26.5 pounds |
| 20 mesh sand | 26.5 pounds |
| 30 mesh sand | 26.5 pounds |

Calcium chloride, 5 percent of water by weight
For Beam 3 the test results gave the following results:

| | |
|---|---|
| Flexural stress at failure | 720 psi |
| Unit weight of beam | 119 lbs./cu.ft. |
| Strength-to-weight ratio | 6.05 |

The above beams will serve to illustrate that by mobilizing and controlling shrinkage effects, prestressing of composite sections of different materials can be effected. The advantage of the shrinkage middle section is to provide the prestressing force which occurs so as to equilibrate the restraint to shrinkage. This is in addition to the advantage of lightness in weight of the resulting composite section. Some stress relaxation of the stressed middle core is to be expected in this case and hence some loss of prestress. Shrinking cores with a minimum of stress relaxation can be designed with more competent sectional cores; i.e., a non-lightweight core section.

Using the dry-pour technique in combination with a proper predetermined structure, it is possible to gain significantly better form or mold definition. As-cast surfaces can be produced in an almost polished condition, reproducing the surface of the mold to within a few times the diameter of the cement particle, which is of the order of 20 microns. Thus, on a production line, using photographic techniques, the mold surface may be made to have raised surfaces for one shade of color and depressed surfaces for another shade. The piece having been cast and cured with one color of pigmentation may then have its depressed areas filled or partially filled with a concrete of another pigmentation and, because of low shrinkage, the differently pigmented concretes may be bonded together. Hence, a realistic imitation grained wood surface or marble surface, or the effect of a brick veneer may be produced. Artistic designs may be duplicated.

The freedom from honeycombing and air pockets in the surface is a significant advantage over normal concrete structures.

The dry-pour concrete of this invention is ideally suited for use on a production line. The dimensional stability obtained and the addition of water in an exactly reproducible manner with no such difference in time, as is met from first to last out of a mixer in a wet mix, means that parts are highly reproducible. The ability of the dry-pour concrete of this invention to adhere and form a good bond in a cold-pour joint enables the production of composite structures of different densities, strengths, cost, or colors.

The greater control of the properties and the greater formability permit the construction of parts heretofore not made in concrete. Concrete can now compete with some ceramics, which cost more because of the necessity for firing. Some properties similar to those of cast iron can be achieved at significantly lower density. Composite beams with greater strength-to-weight ratio, lower density, and lower cost than structural steel appear possible.

Not only the improved properties are important; also important is how the dry-pour technique lends itself to a production line operation and the rapidity with which cure can be completed. Seven day compressive strengths without heat or steam curing of 9,000 psi have been achieved.

It is also possible to use to advantage centrifugal casting techniques and this, particularly combined with techniques for improving tensile strength, can lead to the production of pipe, competitive not only with normal concrete pipe but also with cast iron pipe in the larger dimensions.

For the same reasons that chemical accelerators are used in the usual wet-pour mix, these accelerators can be used in the dry-pour mix. These reasons include, but are not limited to: enabling earlier removal of forms, shortening the curing period, advancing the time when a structure can be placed in service, offsetting the retarding effects of low temperatures, and compensating for the retarding effects of some other admixture. These accelerators can be used to greater advantage in the dry-pour mix than in the prior art wet-pour mix. In a wet-pour mix, there must be little or no delay in casting the concrete, or else early stiffening or loss of slump will occur and the concrete will become unworkable.

In the dry-pour concrete no such disadvantage occurs, for the material is placed and compacted prior to the introduction of water with the chemical accelerator in solution. Evidence of the effectiveness of chemical accelerators is given in the following example: Example 6: Mixture 0 was made as follows:

| | |
|---|---|
| Type I cement | 34.5 pounds |
| 16 mesh sand | 26.5 pounds |
| 20 mesh sand | 26.5 pounds |
| 30 mesh sand | 26.5 pounds |

Calcium Chloride as indicated in FIG. 12

The cure was for 2 days at 100 percent humidity at 140° F and for one day drying at 140° F.

The compressive strengths (28 day) of Mixture 0 are plotted in FIG. 12 against varying proportions of calcium chloride in the water which was added by capillary action, according to this invention.

Mixture P had the same proprotions as Mixture O but was cured for 6 days at 100 percent humidity at 70° F and then for one day, drying at 140° F.

The results shown in FIG. 12 indicate the effectiveness of using a chemical accelerator such as calcium chloride. The results also indicate that approximately 5 percent to 6 percent of calcium chloride (by weight of water) seems to be most effective for this mix.

It is hypothetical that the use of a chemical accelerator is most benefical when the cement used is not fresh. A hydrated film of calcium carbonate is assumed to have formed as a shell about each particle of cement, thereby inhibiting the action of the cement until the shell is broken by the expanding cement in the initial process of hydration. The older the cement, the more competent the hydrated shell. This shell can be broken by mechanical action by the physical act of compaction or by reaching the resonant frequency of the shell by vibration. The shell of calcium carbonate, which acts as a film surrounding the cement particle, may be broken by chemical means, the chemical additive being called the accelerator. For example, if calcium chloride is added in solution, the calcium ion and the chlorine ion separate—the calcium ion being used in the hydration process of the cement. The free chlorine ion finds a free hydrogen ion, and hydrochloric acid is formed. This hydrochloric acid attacks the calcium carbonate shell, under which action the calcium and chlorine combine to form calcium chloride as one product, and the cycle starts all over again. This way, by destroying the calcium carbonate shell, the process allows for more rapid hydration of the cement and results in less reduction in strength where an old or partially hydrated cement is used. Example 7: To show that rapid curing attends the use of calcium chloride.

Mixture Q was made from 1 part cement, 2.3 parts sand, as follows:

| | |
|---|---|
| Type 1 cement | 34.5 pounds |
| 16 mesh sand | 26.5 pounds |
| 20 mesh sand | 26.5 pounds |
| 30 mesh sand | 26.5 pounds |

One sample was made without calcium chloride and had a compressive strength (28 day) of 9,900 psi.

Another sample was made with 3 percent calcium chloride (by weight of water) and was cured at 70° F ambient temperature.

after 22 hours, its compressive strength was 2,170 psi
after 49 hours, its compressive strength was 4,500 psi
after 13 days, its compressive strength was 8,750 psi Because of the unique and novel way of handling and placing dry-pour concrete, it is unnecessary to add other admixtures, as it often is required in the usual prior art wet process, for the following purposes; to improve workability, to reduce the water required, to cause dispersion of cement particles when mixed with water, to retard setting, to reduce or offset shrinkage during setting and hardening, and to reduce bleeding. The use of admixtures in the wet process is sometimes expensive and very often is coupled with a reduction of strength in the final product.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. Concrete or mortar having great strength per weight, low shrinkage, low porosity and a superior as-molded surface, comprising
   a cured compacted mixture of graded fine aggregate and hydrated cement in a preparation such that the amount of cement in a dry compacted state is approximately equal to and no greater than the amount of void space in the compacted fine aggregate, said cement being located almost entirely in the voids between fine aggregate particles so that the fine aggregate particles bear substantially directly on other fine aggregate particles.

2. The concrete or mortar of claim 1 wherein all the aggregate in said concrete is fine aggregate.

3. The concrete or mortar of claim 1 containing a cure accelerator.

4. The concrete or mortar of claim 3 wherein said cure accelerator is calcium chloride.

5. Concrete having simultaneously greater strength per weight, low shrinkage, low porosity and a superior as-molded surface, comprising a cured compacted mixture of
   graded fine and coarse aggregates with hydrated cement in a preparation such that the amount of cement is approximately equal to and no greater than the amount of void space of the compacted fine aggregates, said cement being compacted to a density approaching a maximum for the dry state and being located almost entirely in the voids between said fine aggregate particles so that the fine aggregate particles bear substantially directly on other fine aggregate particles and the combined volume of said fine aggregate and cement being no less than the volume of the void space that would lie between the particles of said coarse aggregate were said coarse aggregate compacted by itself.

6. The concrete of claim 5 wherein one component of said aggregate is much lighter in weight than another component thereof and the lighter-weight component is small enough in particle size relative to the particle size of said other component so that the forces of apparent viscous drag in the fluid-like dry mixture of cement and aggregate from which said concrete is made exceed the apparent buoyancy forces in the dry mixture so that said dry mixture remains geometrically stable and is constrained when water is infused to convert said dry mixture to said concrete.

7. The concrete of claim 5 wherin one componet of said aggregate is much lighter in weight than another component thereof and the size and quantity of the lightweight component are such that as a consequence of proper compaction, it fits completely and for all time is constrained, within the void spaces of said other component, the quantity and proportion of said other component being such that the particles thereof touch each other in the completed mix.

8. A lightweight concrete having good strength, and good strength-weight ratio, comprising a mixture of cement and optimally graded aggregates, wherein one component of said aggregate is much lighter in weight and smaller in particle size than another component thereof, the lighter-weight component being small enough relative to the particle size of the other component so that the forces of apparent viscous drag in the fluid-like dry mixture of cement and aggregate from which said concrete is made exceed the apparent buoyancy forces in the dry mixture so that said dry mixture remains geometrically stable and is constrained when water is infused to convert said dry mixture to said concrete.

9. A lightweight concrete having good strength, and good strength-weight ratio, comprising a mixture of cement and optimally graded aggregates, wherein one component of said aggregate is much lighter in weight than another component thereof and the size and quantity of the lightweight component are such that as a consequence of proper compaction, it fits completely, and for all time is constrained, within the void spaces of said other component, the quantity and proportion of said other component being such that the particles thereof touch each other in the completed mix.

10. The lightweight concrete of claim 8 wherein said lighter-weight component consists of material chosen from the group consisting of foamed silica, foamed ceramic, foamed polystyrene, phenolic microballoons, sawdust, wood flour, cotton linters, and organic fibers.

11. The concrete or mortar of claim 1 wherein said cement contains filler consisting of particles in the order of less than one micron in diameter, said particles fitting within the voids between the particles of said cement, thereby reducing the porosity of the concrete or mortar.

* * * * *